United States Patent [19]

Winslow

[11] Patent Number: 5,009,076
[45] Date of Patent: Apr. 23, 1991

[54] REFRIGERANT LOSS MONITOR

[75] Inventor: James G. Winslow, Detroit, Mich.

[73] Assignee: Temperature Engineering Corp., Sterling Heights, Mich.

[21] Appl. No.: 490,367

[22] Filed: Mar. 8, 1990

[51] Int. Cl.⁵ ............................................. F25B 49/00
[52] U.S. Cl. ...................................... 62/129; 62/209
[58] Field of Search .............. 62/126, 127, 129, 125, 62/130, 209, 208

[56] References Cited

U.S. PATENT DOCUMENTS

| | | | |
|---|---|---|---|
| 3,107,843 | 10/1963 | Finn | 62/193 X |
| 4,220,010 | 9/1980 | Mueller et al. | 62/126 |
| 4,236,379 | 12/1980 | Mueller | 62/126 |
| 4,328,678 | 5/1982 | Kono et al. | 62/126 |
| 4,510,576 | 4/1985 | MacArthur et al. | 62/129 X |
| 4,611,470 | 9/1986 | Enström | 62/129 X |
| 4,612,775 | 9/1986 | Branz et al. | 62/126 |
| 4,677,830 | 7/1987 | Sumikawa et al. | 62/126 |
| 4,745,765 | 5/1988 | Pettitt | 62/129 |

Primary Examiner—Harry B. Tanner
Attorney, Agent, or Firm—Dykema Gossett

[57] ABSTRACT

A refrigerant loss prevention system is disclosed that monitors a number of variables within a refrigerant circuit including both environmental and refrigerant conditions and arrives at expected refrigerant conditions utilizing the sensed environmental conditions. The sensed refrigerant conditions are compared to the expected refrigerant conditions, and alarms are actuated should the two differ by more than a preset amount. The refrigerant loss prevention system continues to operate when the refrigerant circuit is off to identify leaks even during long periods of down time, such as winter.

2 Claims, 1 Drawing Sheet

REFRIGERANT LOSS MONITOR

BACKGROUND OF THE INVENTION

This invention relates to a method and apparatus for monitoring refrigerant conditions within a refrigerant circuit and comparing the monitored conditions to desired conditions. More particularly, the present invention discloses a method and apparatus for actuating a signal should the monitored conditions differ from desired conditions.

Modern air conditioning systems are relatively complex and may comprise a number of monitors and controls. These systems have compressors that can operate at various gradations of capacity between zero and 100 percent, depending on the load on the air conditioning system. Thus, if the load on the system is high, the compressor will be operating near full capacity, while if the load is low, the compressor will be at a relatively low capacity. In addition, air conditioning systems are typically in an off state for a large portion of the calendar year. During the winter months, air conditioning systems remain inactive for long periods of time.

Recently, it has become a major concern to prevent leakage of refrigerant, and in particular chlorofluorocarbons such as freon, into the environment. Among the steps taken to address this concern are devices for changing the refrigerant within an air conditioning system in which the refrigerant within the system is captured when changed. These steps are taken to prevent the escape of refrigerant into the environment, since refrigerants may damage the ozone layer. Preventing escape of refrigerant into the environment is thus a problem faced in the air conditioning field.

However, many modern air conditioning systems do not monitor the refrigerant accurately in order to determine whether there may be leakage. In a large air conditioning system, even a relatively small leak can amount in a great deal of refrigerant reaching the environment. Also, the loss of refrigerant affects the efficiency of the air conditioning system resulting in greater power usage.

Some prior art air conditioning systems do monitor a refrigerant condition, typically the pressure, and actuate an alarm should that condition reach a preset alarm level. A leak will normally cause a pressure loss and thus can be identified by monitoring pressure. The prior art may monitor a refrigerant condition such as the pressure at a low-pressure point in the air conditioning system and compare that pressure to a preset alarm level. If the low-pressure is beyond that preset alarm level, a determination is made that there is some problem in the air conditioning system, and an alarm is actuated, often shutting the system down. These types of systems may monitor both high and low-pressure at various points within the air conditioning system.

These prior art systems do not adequately address the problem of refrigerant leakage, instead, they merely compare the actual refrigerant condition to a preset alarm level. The preset alarm level does not vary with varying environmental conditions even though the conditions within the refrigerant circuit of the air conditioning system do vary with varying environmental conditions. Also, these preset alarm levels do not vary for variable operating conditions of the air conditioning systems, such as full or partial capacity of the compressor, or an off condition of the air conditioning system. They do not operate at all when the system is off. The low-pressure expected at a particular point in an air conditioning refrigerant system may be different for a full capacity condition as opposed to a 50 percent capacity condition. Prior art systems that do not vary the alarm levels necessarily set the alarm levels at the lowermost or highermost condition which could reasonably be expected during normal operating conditions of the air conditioning system. Thus, these preset alarm limits cannot accurately monitor the refrigerant circuit and detect a small leak.

It is therefore an object of the present invention to disclose a refrigerant loss prevention system which is sensitive to leakage and actuates an alarm signal when leakage is detected.

SUMMARY OF THE INVENTION

The present invention discloses a method and apparatus for monitoring refrigerant conditions within a refrigerant circuit. A disclosed embodiment of the present invention includes an air conditioning system comprising a refrigerant circuit containing a refrigerant, a compressor to compress the refrigerant and means to transfer heat from air that is to be cooled to the refrigerant, wherein a refrigerant loss monitor monitors the refrigerant in a refrigerant circuit.

Broadly stated, the method of the present invention involves sensing an environmental condition and identifying a desired refrigerant condition by calculating what at least one refrigerant condition should be due to this environmental condition assuming there is a correct amount of refrigerant within the refrigerant circuit. The refrigerant loss monitor compares the sensed refrigerant condition to this desired refrigerant condition and actuates signals should the two conditions differ by more than a preset amount.

In this application, the term "differing by more than a preset amount" includes not only actuating the alarm should the sensed condition differ from an expected condition by more than a discrete amount, but also as an alternative, actuating the alarms should the sensed condition exceed the desired condition. In this sense, the desired condition is much like the alarm levels that are utilized in the prior art. However, in this invention, these alarm levels vary with the sensed environmental conditions.

In a sense the refrigerant loss monitor compares a normal, or expected refrigerant condition, such as pressure, with actual pressures present in the system. The expected condition is variable with varied environmental conditions. In one embodiment, a memory may contain the proper volume of refrigerant and makes a comparative analysis of volume, pressure and temperature of the refrigerant. A refrigerant loss monitor makes use of the fact that a properly charged refrigerant circuit will maintain known pressures, at a given volume, ambient temperature and load.

In a preferred embodiment of the present invention, the refrigerant loss monitor includes sensors to sense both environmental conditions and refrigerant conditions and further includes means to identify a desired refrigerant condition based on the sensed environmental condition. The means to identify a desired refrigerant condition utilizes the sensed environmental conditions and assumes a desired amount of refrigerant within the refrigerant circuit. From this, the means to identify reaches a desired refrigerant condition which is compared to the sensed refrigerant condition. If the sensed refrigerant condition differs by more than a preset amount from the desired refrigerant condition, an alarm is actuated to give a signal that there is a problem with the refrigerant circuit. Although this alarm is utilized in order to determine whether there is a leakage in the refrigerant circuit, the problem that is identified could be a failure of a component of the air conditioning system.

The sensed environmental conditions can include the load on the air conditioning system, which can be determined by monitoring the temperature of the air within a room to be cooled or by monitoring the temperature of a cooling water line. In addition, other known means of sensing the load may be utilized. Another environmental condition is the ambient temperature at the location of the air conditioning system. In large office buildings, this may be an enclosed room. Often, however, the air conditioning system is mounted upon the roof of the building. Further, the outdoor temperature may be sensed. Also, the operating condition of the compressor may also be sensed. The compressor may be running at any percentage of capacity between zero and 100 percent. The air conditioning system could be shut off, for instance during the winter months or when it is not necessary to cool the air and this state would also be considered.

The sensed refrigerant conditions may include the superheat of the refrigerant, the pressure of the refrigerant, at both high-pressure and low-pressure locations and the refrigerant temperature within a refrigerant receiver may be sensed.

In a most preferred embodiment of the present invention, all of these sensed readings are connected into a microprocessor which determines desired refrigerant conditions based upon the sensed environmental conditions and compares the sensed refrigerant conditions to the desired refrigerant conditions. The microprocessor actuates alarms if the desired and sensed refrigerant conditions differ by more than a preset amount.

In a most preferred embodiment, a refrigerant loss monitor, which includes a microprocessor, has a memory which includes a number of data entries, such as the refrigerant tables for the particular refrigerant utilized. In addition, the desired amount of refrigerant within the refrigerant circuit is retained in memory. Also, the refrigerant loss monitor may be provided with means to utilize perfect gas laws to perform calculations utilizing the sensed conditions. A working memory of the refrigerant loss monitor may include a number of items, such as the environmental sensed conditions mentioned above. For instance, it may not be necessary to sense ambient temperature as frequently as the refrigerant conditions are sensed. An ambient temperature reading could be stored in the working memory, and new readings taken periodically.

In one embodiment of the present invention, a single environmental condition is sensed, such as outdoor temperature, and a expected refrigerant condition is determined utilizing this sensed environmental condition. As an example, the expected low-pressure reading can be compared to the actual sensed condition. Should this sensed condition exceed the expected condition an alarm can be actuated. The expected condition varies with the sensed environmental condition, and a refrigerant loss monitor as disclosed by this embodiment of the present invention includes a memory that assigns a particular expected low-pressure condition to the particular sensed environmental condition and accurately determines whether a refrigerant loss is occurring. The expected values could be determined experimentally by testing a unit to identify normal values and entering values determined by these tests into the memory.

In the prior art, the alarm levels were set at one level for any environmental condition. Due to this, the alarm levels had to be at the most extreme level that could possibly be expected under any operating conditions of the air conditioning system. With the present invention, the alarm levels vary and are tailored to the actual operating condition of the system and thus are much more sensitive to any leakage in the refrigerant circuit.

In one embodiment of the present invention, the refrigerant loss monitor continues to monitor the amount of refrigerant within a refrigerant circuit even when the air conditioning system is shut down, or off. A leak can occur during the winter and by monitoring the system while it is shut down, the refrigerant loss monitor accurately predicts when a refrigerant loss is occurring before any substantial amount of refrigerant has leaked from the system.

In a preferred embodiment of the present invention, the refrigerant loss monitor monitors the low-pressure of the refrigerant in a refrigerant reservoir during an off period. Also, the ambient temperature is sensed during the off period. By utilizing the ambient temperature, a prediction can be made as to what the low-pressure in the reservoir should be, assuming there is the proper amount of refrigerant within the refrigerant circuit. Should the sensed low-pressure refrigerant pressure in the reservoir differ from this expected refrigerant pressure an alarm can be actuated.

During the off-state, it is preferable to monitor pressure at a position likely to contain refrigerant in both a liquid and vapor state. This would be on the low pressure side of the refrigerant circuit. In a position having both liquid and vapor pressure temperature corresponds to pressure and refrigerant leakage can be accurately monitored.

The necessary formulas for performing the calculations are all well known in the thermodynamics art and need not be restated here. By adding to the number of sensed variables, the degree of precision of the resulting desired refrigerant condition and the identification of a problem within the air conditioning system may be made more sensitive.

Preferably, a communications port is connected into the refrigerant loss monitor allowing access from an operator or computer system to override the refrigerant loss monitor or enter any additional information.

It should be understood that while an air conditioning system is disclosed, this invention has application in any refrigerant circuit.

These and other objects and features of the present invention can be best understood from the following specification and drawings, of which the following is a brief description.

DETAILED DESCRIPTION OF A PREFERRED EMBODIMENT OF THE INVENTION

Figure 1:
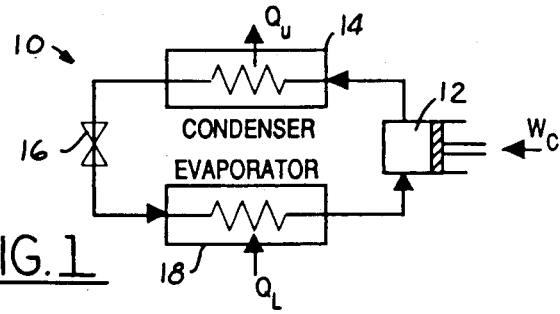
FIG. 1 is a schematic diagram showing a refrigerant circuit.

An embodiment of the present invention will be disclosed with reference to FIGS. 1-4. FIG. 1 is a schematic illustration of refrigerant circuit 10 for an air conditioning system. It should be understood that the refrigerant circuit as disclosed by the present invention can be utilized with other types of refrigerating systems and is not limited to air conditioning systems.

The refrigerant circuit 10 of the present invention includes compressor 12 for compressing the refrigerant, condenser 14 for delivering heat from the refrigerant to the environment, expansion valve 16 for lowering the pressure of the refrigerant and evaporator 18 for taking heat from a source of heat to be cooled. Refrigerant circuit 10 flows from compressor 12 into condenser 14 through expansion valve 16, into evaporator 18 and then back to compressor 12. It should be understood that refrigerant circuits utilized in air conditioning systems for large buildings may have additional features, such as refrigerant storage receivers in the refrigerant lines. The refrigerant circuit 10 illustrated in FIG. 1 is an overly simplified schematic diagram which is included only as an example of one type of system to which the present invention can be applied.

Figure 2:
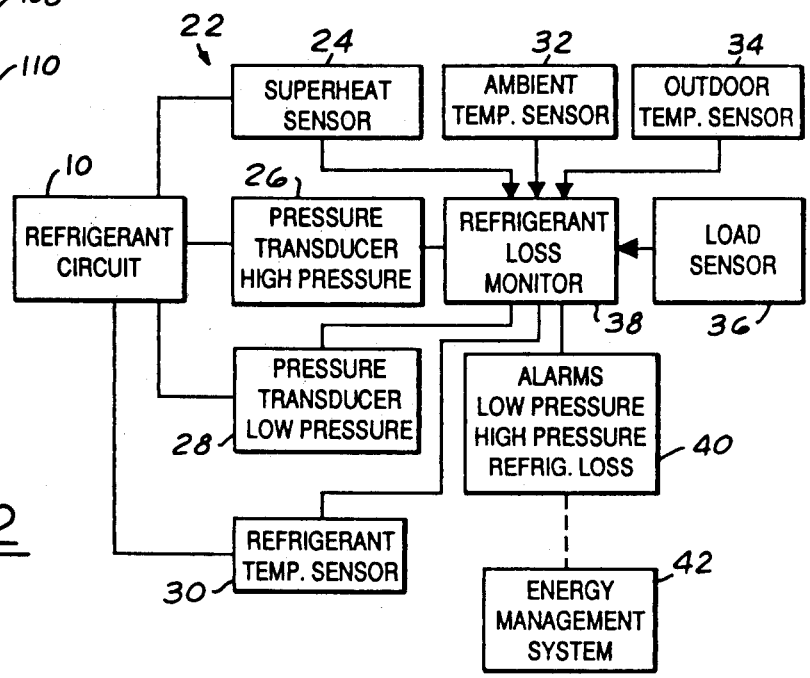
FIG. 2 is a schematic diagram showing the refrigerant loss monitor of the present invention.

FIG. 2 shows refrigerant circuit 10 connected to refrigerant loss prevention system 22. Refrigerant loss prevention system 22 includes superheat sensor 24, high-pressure pressure transducer 26, low-pressure pressure transducer 28, and refrigerant temperature sensor 30, all connected into air conditioning refrigerant circuit 10. The refrigerant conditions are supplied to monitor 38. Superheat sensor 32 is preferably positioned on a compressor suction line. A saturation temperature can be identified from refrigerant tables and subtracted from the sensed superheat temperature to determine the superheat of the suction side refrigerant. High-pressure sensor 26 is positioned at a compressor discharge line. Low-pressure transducer 28 may be on either the evaporator outlet or the compressor suction line. Refrigerant temperature sensor 30 is preferably positioned on a refrigerant receiver. These inputs may be defined as refrigerant conditions.

Ambient air temperature sensor 32, outdoor air temperature sensor 34, and load sensor 36 all supply signals to refrigerant loss monitor 38. These inputs may be defined as environmental conditions. Refrigerant loss monitor 38 may also receive a signal of the operating capacity of compressor 12 in air conditioning refrigerant circuit 10, including whether compressor 12 is at full capacity, some percentage of partial capacity or at an off condition. Refrigerant loss monitor 38 compares the various sensed signals and by utilizing at least one environmental condition determines what at least one of refrigerant conditions 24, 26, 28 and 30 should be. That is, refrigerant loss monitor determines at least one desired or expected refrigerant condition. Refrigerant loss monitor then compares the sensed refrigerant conditions to the expected refrigerant conditions.

The expected refrigerant conditions can be compared to the sensed refrigerant conditions and alarms actuated should the two differ by more than a preset amount, or alternatively should the refrigerant condition exceed an expected refrigerant condition. It should be understood that the greater the number of sensed conditions, including both environmental and refrigerant conditions, that are utilized, the greater the sensitivity of the loss prevention system 22 to a small leak in refrigerant circuit 10. As an example, if four environmental conditions are sensed along with four refrigerant conditions, and it is assumed that three of the refrigerant conditions are accurate it would be possible to very accurately predict what the fourth refrigerant condition should be, provided the amount of refrigerant is as expected. Once the necessary calculations have been made, the fourth sensed refrigerant condition can be compared to this expected refrigerant condition and alarms actuated should the two amounts differ by even a small amount. On the hand, it may be preferable to sense a smaller number of conditions and allow a greater difference between the expected and sensed refrigerant conditions. Although such a system may not be as sensitive, it would be less complex.

If the expected refrigerant conditions differ from the sensed refrigerant conditions by more than a preset amount, refrigerant loss monitor 38 actuates alarms 40, which may give an indication as to exactly which refrigerant condition differs from an expected condition. Alarms 40 may be audio or visual and may feed into energy management system 42 of a building climate control system, as is commonly found in large office buildings, for instance.

The various pressure and temperature sensors may be well-known items mounted within the refrigerant lines. Alternatively, pressure transducers 26 and 28 may be ultrasound pressure transducers that are mounted outside the refrigerant lines.

Figure 3:
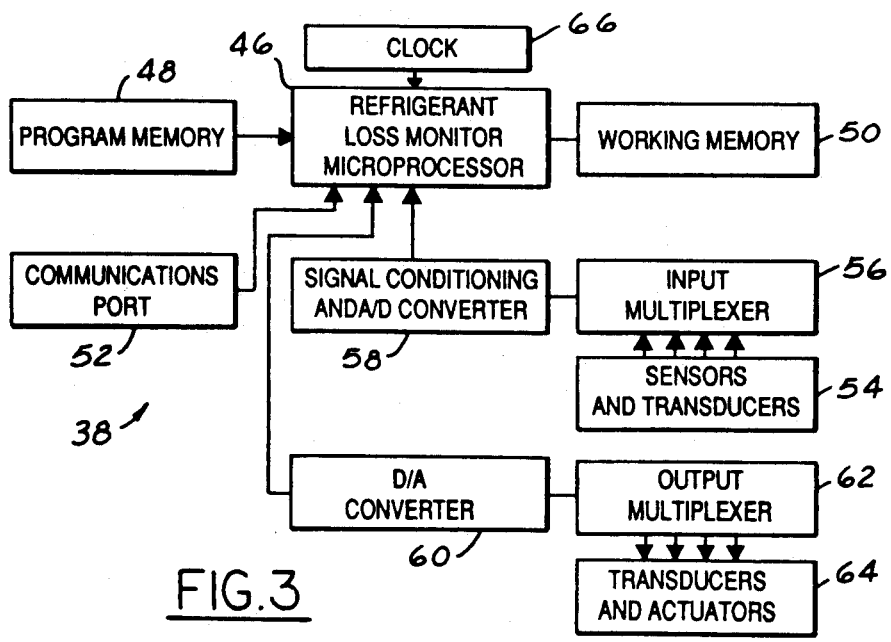
FIG. 3 is a schematic diagram of the refrigerant loss monitor illustrated in FIG. 2.

The details of refrigerant loss monitor 38 are shown in FIG. 3 in which microprocessor 46 is illustrated having program memory 48 and working memory 50. Program memory 48 includes the code for the microprocessor and also may include fixed data for the particular air conditioning refrigerant circuit 10. Among the fixed data may be refrigerant tables, such as the Mollier diagram, the perfect gas laws, the desired amount of refrigerant for that particular refrigerant circuit and other conditions which will not vary during the operation of refrigerant circuit 10.

Working memory 50 may include short-term memory items such as sensed ambient temperature 32 or sensed outdoor temperature 34. The environmental conditions may be sensed less frequently than the sensed refrigerant conditions and stored in working memory 50 for a period of time. As an example, since the outdoor temperature sensed through outdoor temperature sensor 34 will not vary greatly over time it only need be sensed once each discrete time element and can be stored within working memory 50. For instance, it may only be necessary to sense ambient temperature or outdoor temperature once every hour. It is preferable that refrigerant conditions 24, 26, 28 and 30 would be sensed much more frequently than that.

Communication port 52 allows an operator to interface with microprocessor 46 and also allows refrigerant loss monitor 38 to be connected to energy management system 42. Port 52 allows program tuning and is a standard device.

The various inputs from the sensors are indicated at 54 and are sent to microprocessor 46 through input multiplexer 56, which is connected to signal conditioning and A/D converter 58. Microprocessor 46 evaluates the various inputs, as discussed elsewhere, and makes a determination as to whether there is a problem with the system. Microprocessor 46 then outputs a signal to D/A converter 60 which is connected to output multiplexer 62. Output multiplexer 62 is connected to a plurality of actuators 64 which actuate the various alarms or signals 40. Clock 66 is connected to microprocessor 46 and operates in a known manner.

These details of signal handling, including both the input and output of signals from microprocessor 46 form no part of this invention, and other known types of signal handling may be utilized. As an example a digital output may be utilized.

Microprocessor 46 utilizes sensed environmental conditions and compares them to data within its memories in order to make a determination as to an expected refrigerant condition. Microprocessor 46 then compares that expected refrigerant condition to an actual sensed refrigerant condition and initiates an output should those two refrigerant conditions differ by more than a preset amount.

As one example, microprocessor 46 may consider the ambient temperature, outdoor temperature and load, along with the capacity of the compressor and make a determination as to what the pressures sensed by pressure sensors 26 and 28 should be if there were the proper amount of refrigerant within the air conditioner refrigerant circuit 10. This determination could be a range rather than a single temperature. It may be determined, for a particular refrigerant circuit that the sensed environmental conditions should result in a particular expected low-pressure. Once that determination is made, the actual low-pressure sensed by sensor 28 is compared to this expected pressure value, and if the sensed values differ, an alarm is actuated.

Only one or two of the environmental conditions need be utilized in order to make a determination as to an expected refrigerant condition. The fewer the number of environmental conditions utilized in making the determination of the expected refrigerant condition, the less sensitive the system is to small leaks. That is, the more environmental conditions utilized in the calculation, the more accurate the expected refrigerant condition will be.

In one disclosed embodiment of the present invention, a single environmental condition is sensed, such as outdoor temperature, and a desired refrigerant condition is determined utilizing this sensed environmental condition. As an example, the low-pressure reading expected by a low-pressure monitor at a low-pressure location in the refrigerant circuit can be compared to the actual sensed condition. Should this sensed condition exceed the expected condition an alarm can be actuated. The expected condition varies with the sensed environmental condition, and refrigerant loss monitor 38 as disclosed by this present invention may include a memory that would assign a particular expected low-pressure condition to the particular sensed environmental condition. In this way, the present invention may determine whether there is a problem in the system. The problem may be a refrigerant leak, or it could be a problem with another component.

In the prior art, alarm levels were set at one level for any environmental condition. Due to this, the alarm levels had to be at the most extreme level that could possibly be expected under any operating conditions of the air conditioning system. With the present invention, the alarm levels are varied with the actual operating condition of the system and thus are more sensitive to leakage in the refrigerant circuit.

As another example, microprocessor 46 may consider the various environmental conditions and also assume one of the sensed refrigerant conditions is accurate. From this, other refrigerant conditions may be predicted, assuming that the amount of refrigerant is as desired. Again, should the sensed refrigerant condition differ from the expected refrigerant conditions, alarms 40 are actuated.

With refrigerant loss monitor 38 of the present invention, the amount of refrigerant is monitored even when the refrigerant circuit is in an off condition. Throughout the winter the amount of refrigerant will be monitored, and signals actuated should the amount differ from an expected amount.

In a preferred embodiment of the present invention, refrigerant loss monitor 38 monitors the low-pressure 28 of the refrigerant in a refrigerant reservoir during an off period. Also, ambient temperature 32 and refrigerant temperature 30 are sensed during the off period. By utilizing ambient temperature 32, a prediction can be made of an expected low-pressure in the reservoir, assuming there is the proper amount of refrigerant within the refrigerant circuit. Should sensed refrigerant low-pressure 28 in the reservoir differ from this expected refrigerant pressure an alarm is actuated.

Although the specific calculations utilized in order to determine the expected refrigerant conditions are not disclosed in this application, they would be well known to a worker in the art and form no part of this invention.

Additionally, to practice this invention, it is not necessary that an expected refrigerant condition be identified to a great degree of accuracy. The expected refrigerant condition can have a margin of error.

Also, it is possible to determine the amount of refrigerant, rather than the sensed refrigerant condition. The sensed conditions including refrigerant conditions can be utilized to calculate what amount of refrigerant is in the system. This amount is compared to the proper amount, which is stored in memory. In this regard, the amount of refrigerant in the system is a refrigerant condition which is "sensed".

Figure 4:
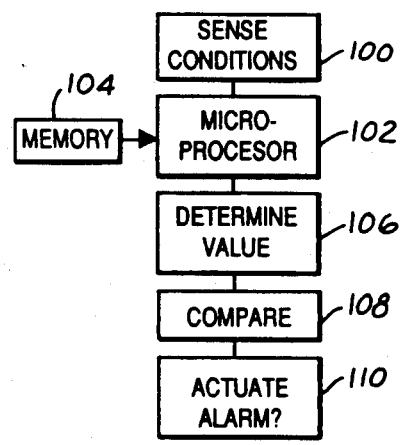
FIG. 4 is a logic flow chart.

FIG. 4 is a logic flow chart for the present invention. Conditions are sensed at 100, and may include any of a plurality of refrigerant or environmental conditions. These conditions are sent to microprocessor 102 which also receives data from memory 104. Memory 104 could have stored environmental conditions that were previously sensed. Microprocessor 102 then determines a value 106 which could be an expected refrigerant condition, or the actual amount of refrigerant in the system. The value could be determined less frequently than the frequency of sensing refrigerant conditions. If the environmental conditions are sensed infrequently, the value may only be determined infrequently. This determination step may be as simple as assigning a predetermined alarm level to a low-pressure reading where the alarm level varies with an environmental condition, such as load on the refrigerant circuit. However, it may be as complicated as using refrigerant tables, gas laws and other thermodynamic equations to reach an exact expected refrigerant condition or refrigerant amount. This determined value is then compared 108 to another value that would either be an actual sensed refrigerant condition, or a desired amount of refrigerant. If the two values differ an alarm may be actuated 110.

A working embodiment of the present invention has been disclosed; however, a worker of ordinary skill in the art would realize that certain modifications would come within the scope of this invention, and thus the following claims should be studied in order to determine the true scope of the invention.

What is claimed is:

1. A method of monitoring the refrigerant within a refrigerant circuit, including the steps of:
   (b 1) sensing an environmental condition;
   (b 2) cyclically sensing a refrigerant condition;
   (b 3) utilizing at least the sensed environmental condition to determine an expected refrigerant condition; and
   (b 4) comparing the expected refrigerant condition to the actual refrigerant condition and actuating an alarm should the two differ by more than a preset amount and wherein steps 1-14 4 are cyclically repeated even when the refrigerant circuit is shut down.

2. A method as recited in claim 1, wherein the expected refrigerant condition is determined by further considering whether the refrigerant circuit is shut down or running.

* * * * *